E. B. KILLEN.
PNEUMATIC SHOCK ABSORBING DEVICE PARTICULARLY APPLICABLE TO VEHICLES.
APPLICATION FILED MAY 6, 1915.
1,201,593.
Patented Oct. 17, 1916.
6 SHEETS—SHEET 1.
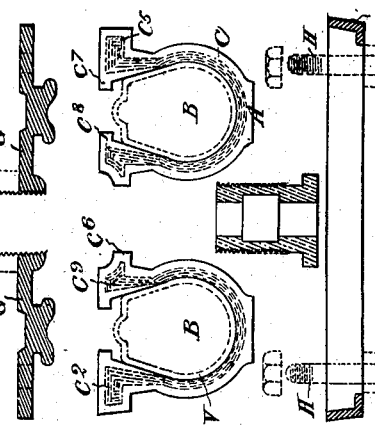
Fig. 4.
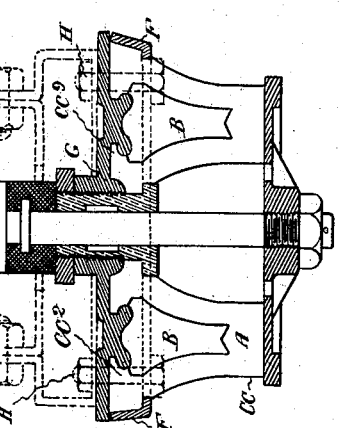
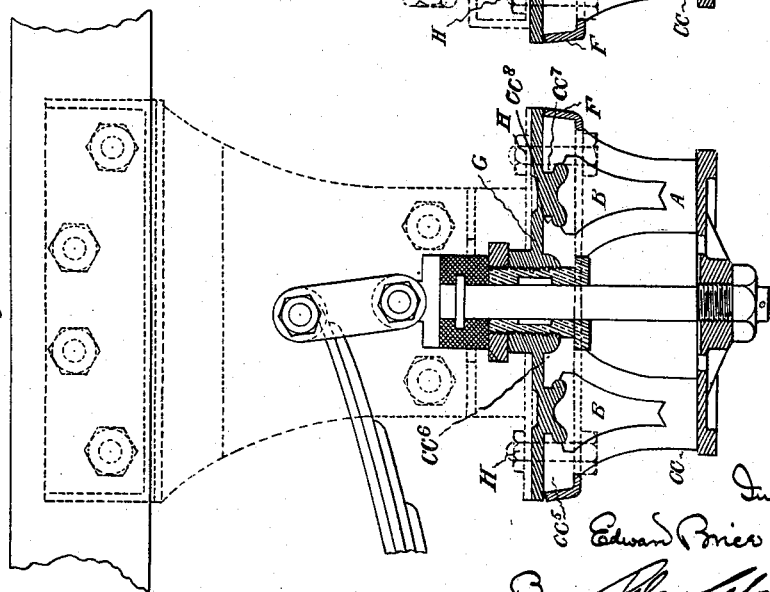

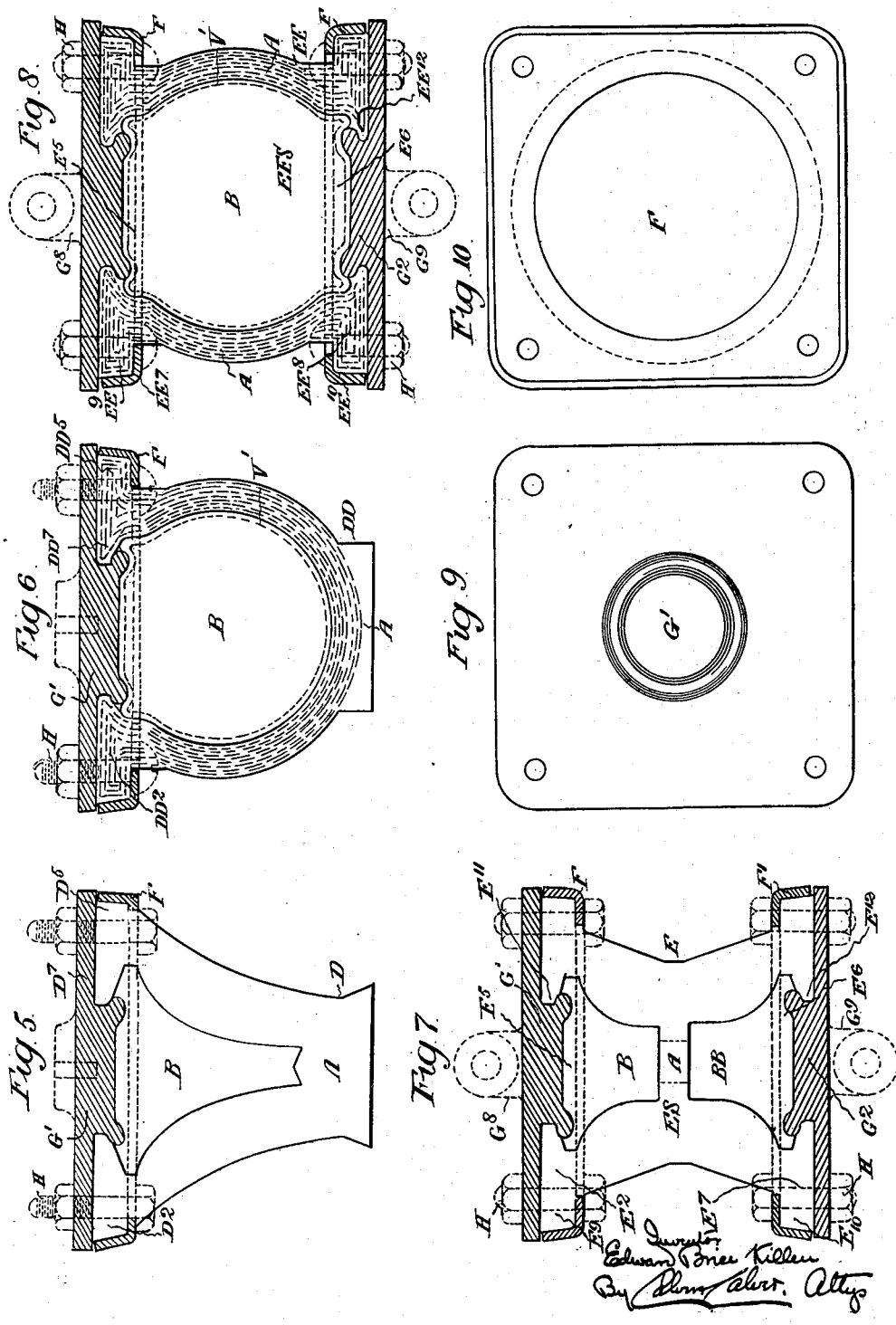

E. B. KILLEN.
PNEUMATIC SHOCK ABSORBING DEVICE PARTICULARLY APPLICABLE TO VEHICLES.
APPLICATION FILED MAY 6, 1915.
1,201,593.
Patented Oct. 17, 1916.
6 SHEETS—SHEET 3.
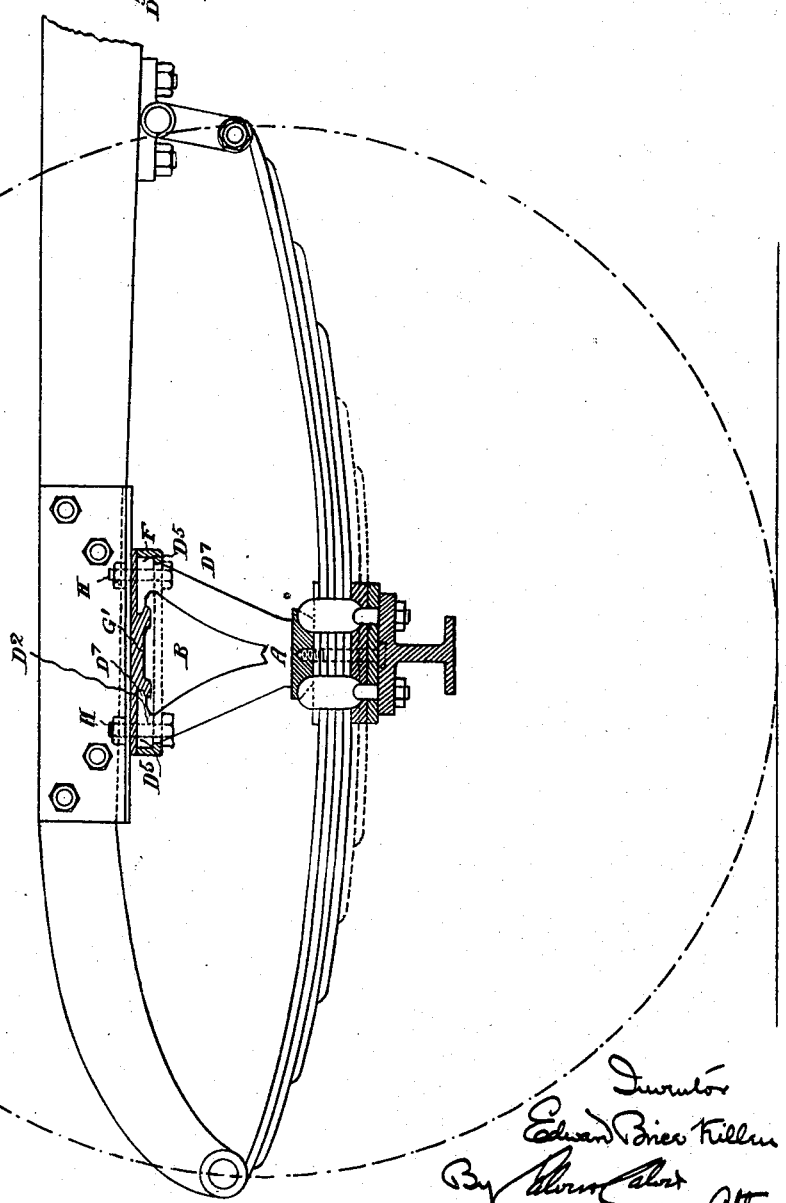

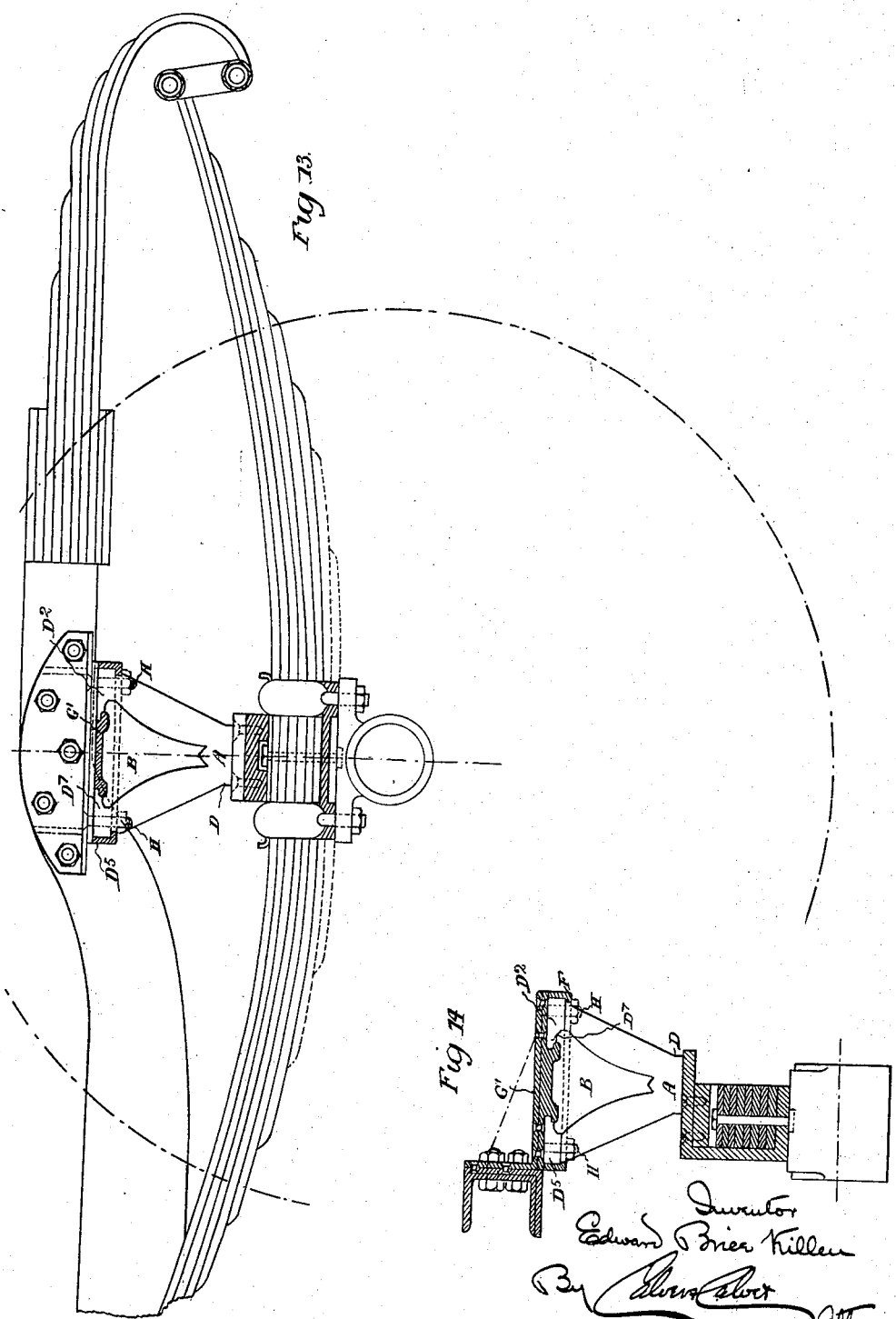

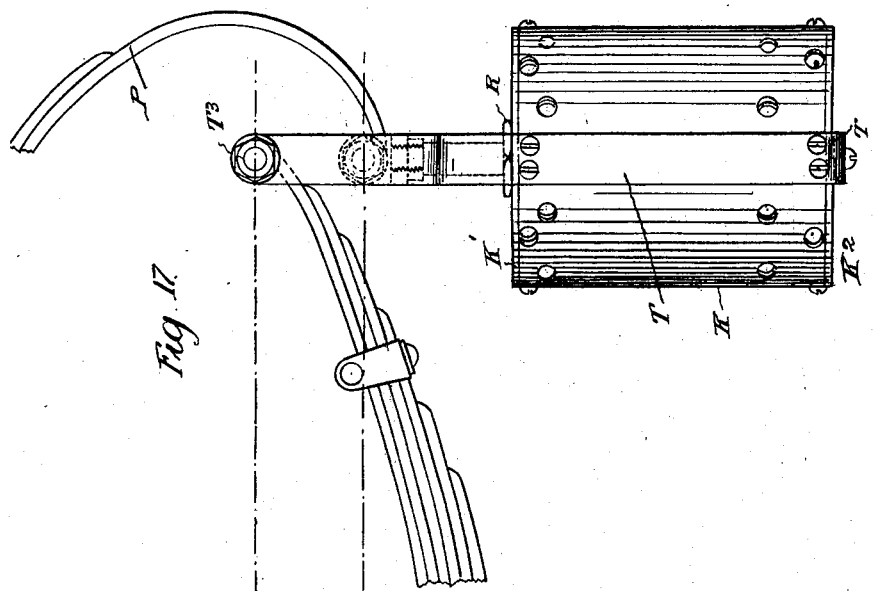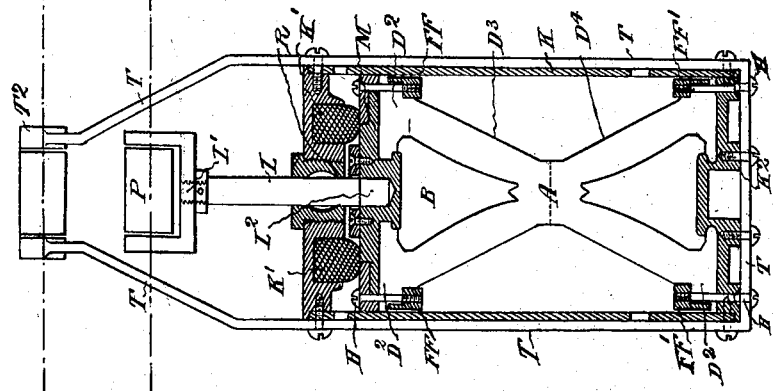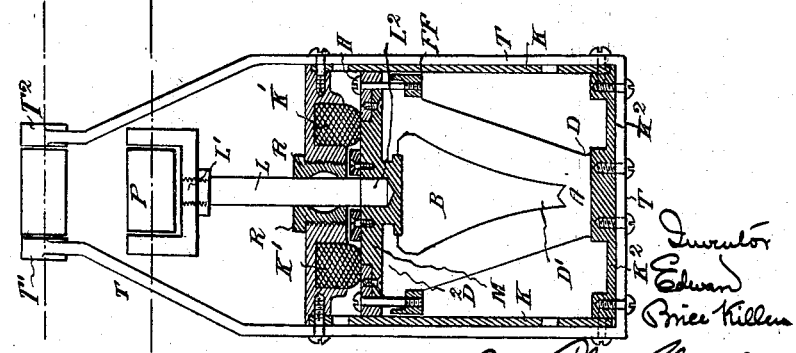

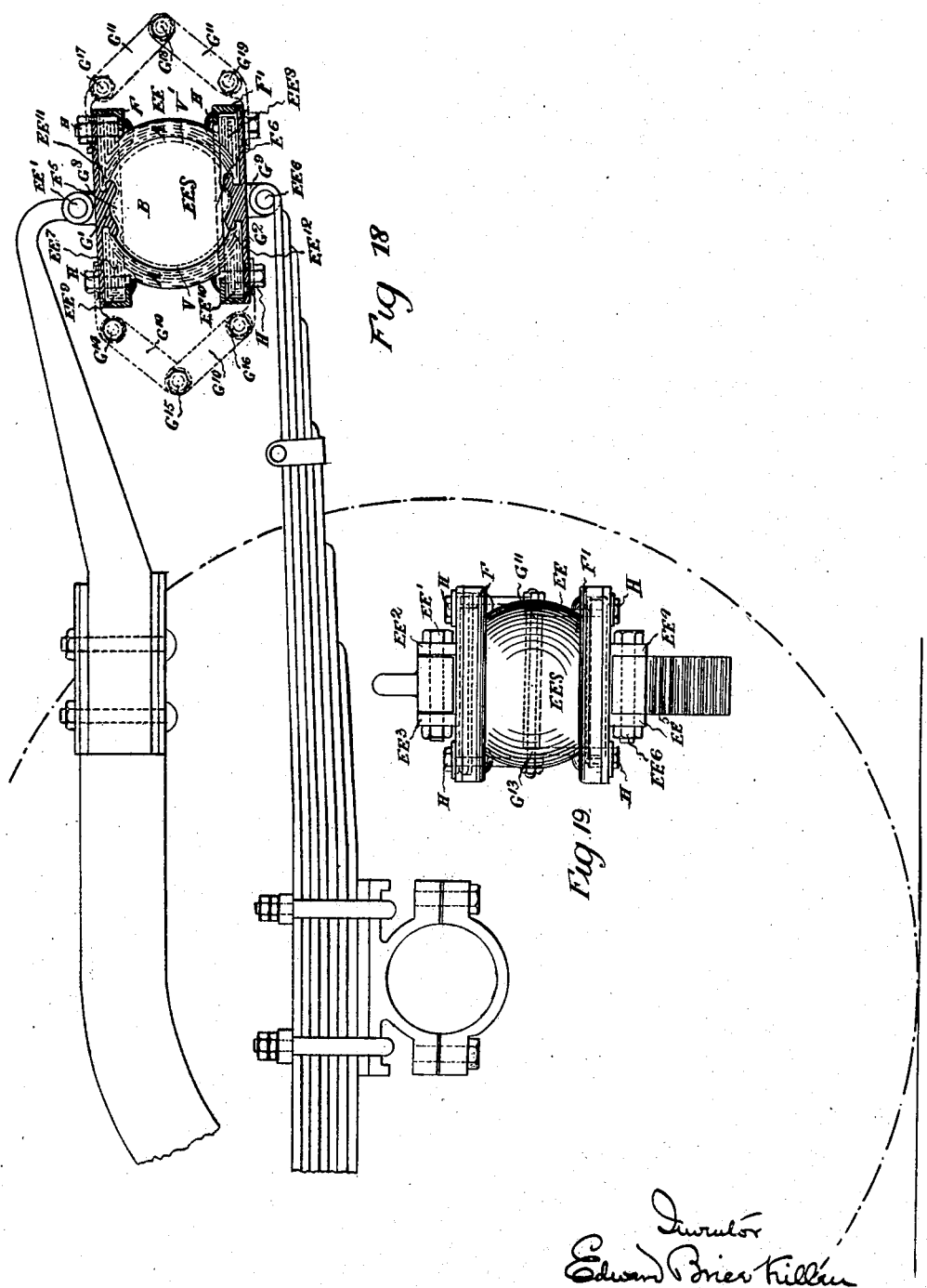

UNITED STATES PATENT OFFICE.

EDWARD BRICE KILLEN, OF LONDON, ENGLAND.

PNEUMATIC SHOCK-ABSORBING DEVICE PARTICULARLY APPLICABLE TO VEHICLES.

1,201,593.  Specification of Letters Patent.  Patented Oct. 17, 1916.

Application filed May 6, 1915. Serial No. 26,409.

*To all whom it may concern:*

Be it known that I, EDWARD BRICE KILLEN, of 27 Queen Victoria street, London, England, engineer, have invented certain new and useful Improvements in or Relating to Pneumatic Shock-Absorbing Devices Particularly Applicable to Vehicles, of which the following is a specification.

My invention relates to pneumatic shock absorbing devices particularly applicable to vehicles.

At present existing laminated steel spring suspensions are designed to bear the maximum load or shock put on a vehicle and are therefore much too stiff when the vehicle is carrying a light load which in commercial vehicles (where there is a great difference in weight between a vehicle running light and fully loaded) makes the laminated spring practically inoperative when the vehicle is empty or slightly loaded. It has been found impossible to design a steel spring of such periodicity so as to correspond with the rapid succession of impacts which a fast car has to over-ride.

According, however, to my invention I use, as a shock absorbing medium, an air retaining cover with one or more attachment base-beads, each bead having a hooking heel and a keyable extended toe. The extended toe enables a permanent airtight joint to be formed on each base-bead by jamming the rubber toe tightly against a hooking metal boss-part formed on an air retaining plate, by means of an endless flanged metal attachment ring device with bolts and nuts, the stems of which bolts pass through the endless flanged metal attachment ring device, the hooking heel of each base-bead and the air retaining metal plate, thereby jamming the rubber toe under great compression between the hooking metal boss-part of the air retaining plate and the endless flanged metal attachment ring device, and at the same time automatically locking the bolts and nuts in their position against vibration. It is to be noted that the attachment of the air retaining cover to the air retaining metal plate forms an airtight joint and is quite independent of any other airtight joint formed by means of an extra air retaining bag. The buffer device with its air retaining plate is used as an auxiliary pneumatic spring for absorbing many shocks which cannot be absorbed by means of steel springs, and by means of my pneumatic buffer device I obtain a saving in wear and tear of material besides many other advantages. This pneumatic buffer device enables air originally confined at atmospheric pressure and without having to use an air pump to be utilized under many varying pressures in such a manner that said air may be quickly and automatically densified under varying loads as and when required, without developing serious friction or heat. This pneumatic buffer device when suitably and airtightly attached is always self-adjusting.

I am aware that it has been proposed to combine existing laminated springs with pneumatic suspensions, which have auxiliary means for adjusting air pressures inside said suspensions to enable the pneumatic suspensions to carry loads in excess of the minimum load for which the laminated springs were designed. My invention, however, utilizes a pneumatic self-adjusting shock absorbing device with existing laminated springs without using any auxiliary or mechanical means for densifying the air inside the pneumatic buffer.

My construction is as follows: In order that my invention may be properly understood and readily carried into effect, I have hereunto appended six sheets of drawings, of which, Figure 1 is a sectional elevation of a pneumatic shock absorbing device having a pneumatic tube ring manufactured homogeneously of rubber, the said ring being compressed by means of a plunger and spindle attached by a shackle to one end of the laminated steel spring of a motor chassis, the whole device being rigidly attached to the chassis frame. Fig. 2 is a sectional elevation of a device similar to Fig. 1, shown in detail in separate parts but having its pneumatic tube ring manufactured of fabric and rubber. It may also have an inner tube. Fig. 3 is a transverse section of Fig. 1. Fig. 4 is a plan of the flanged metal ring device for attaching the pneumatic tube rings to their base plates. Figs. 5, 6, 7 and 8 show sectional elevations of various forms of pneumatic buffer devices, each device having an air retaining cavity stud or buffer cover with one or more attachment beads, each bead being constructed with hookable heels and a continuous keyable extended toe, and is capable of being airtightly attached under great compression to an air retaining metal plate by means of an attachment flanged metal ring device, bolts and nuts. Fig. 9 shows a plan of an air retaining metal plate with a boss part to which each bead of an air retaining cavity stud or buffer cover may be airtightly attached under great compression. Fig. 10 shows a plan of an attachment flanged metal ring device used with bolts and nuts for mechanically attaching airtightly an air retaining cavity stud or buffer cover to an air retaining metal or other plate under great compression. Fig. 11 is a sectional elevation of one form of a pneumatic stud buffer applied to the center of the front laminated steel spring of a chassis. Fig. 12 is a transverse section of Fig. 11. Fig. 13 is a similar view to Fig. 11 showing the application of one form of a pneumatic stud buffer to the center of the rear spring of a chassis. Fig. 14 is a transverse section of Fig. 13. Fig. 15 is a sectional elevation of a pneumatic shock obsorbing device having a pneumatic stud buffer attached to a fixed plunger and spindle and surrounded by a cylindrical casing which cylindrical casing may reciprocate upon the said plunger and spindle. Fig. 16 is a sectional elevation of a larger apparatus using two pneumatic stud buffers. Fig. 17 is an outside elevation of Fig. 15 showing its attachment to the chassis and laminated steel spring. Fig. 18 is a sectional elevation of a fabric and rubber air retaining cover used with or without an internal air bladder and securely fixed to top and bottom rocking plates, which plates are pivoted to the chassis, the whole forming a pneumatic shackle. Fig. 19 is an elevation of Fig. 18.

With this invention I construct what I call a pneumatic buffer device A which is the combination of a sealed air retaining cover, an air retaining metal plate or plates and an endless attachment metal ring device or devices each say having three or four bolts and nuts, the stems of which bolts pass through the endless attachment metal ring device, the hooking heels of the base-beads, and the air retaining metal plate. The air retaining cover C or CC, D or DD, E or EE, may be constructed in any suitable or well-known shape provided it is formed having attachment beads, each bead being constructed having hooking heels through which the bolt stems may pass and a keyable extended toe capable of mechanically forming air-tight attachment joints.

The air retaining cover may be a tube ring air cover C or CC (see Figs. 1, 2, 3) having base beads $C^2$, $C^9$, and $CC^2$, $CC^9$ formed with heels $C^5$, $C^6$ and $CC^5$, $CC^6$, and toes $C^7$, $C^8$ and $CC^7$, $CC^8$, capable of being airtightly attached to an air retaining metal plate G by means of an attachment ring device F with bolts and nuts H (see Figs. 1, 2, 3, 4); or the air retaining cover may be a cavity stud air cover D or DD (see Figs. 5 and 6) having beads $D^2$, or $DD^2$ formed with heels $D^5$, or $DD^5$, and toes $D^7$ or $DD^7$, capable of being airtightly attached to an air retaining metal plate $G^1$ by means of an attachment ring device F with bolts and nuts H (see Figs. 5—6 and 9—10); or the air retaining cover may be a cavity buffer air cover E or EE, and capable of being formed into a pneumatic shackle ES or EES (see Figs. 7—8 and 18) having beads $E^2$, $E^7$, or $EE^7$, $EE^8$ formed with heels $E^9$, $E^{10}$, or $EE^9$, $EE^{10}$, and toes $E^{11}$, $E^{12}$, or $EE^{11}$, $EE^{12}$, capable of being airtightly attached to two air retaining metal plates $G^1$ and $G^2$, by means of attachment ring devices F and $F^1$ with bolts and nuts H (see Figs. 7—8 and 9—10).

My pneumatic buffer device A is capable of being easily and mechanically fitted to the end of a laminated spring (see Figs. 1 and 3, Sheet 1) or to a chassis frame above the center part of a laminated spring (see Figs. 11, 12, 13, 14), and when I attach the pneumatic buffer device A to a chassis frame above the center part of a laminated spring I may reduce the stiffness of the laminated spring by taking away one or more spring leaves so as to make the laminated spring sensitive to carry the minimum load, (see Figs. 11 and 13) which show the spring leaves to be taken away in dotted lines, and also show how I make use of my buffer device A to carry all loads over the minimum load. This re-arrangement of the existing laminated steel spring suspension of a car or chassis in combination with my pneumatic buffer device A enables the steel spring suspension to be made sensitive under a minimum axle load, which steel spring suspension is strong enough when used in combination with the pneumatic buffer device A to carry efficiently and sensitively all axle loads over the minimum and up to the maximum load without interfering with the spring's range of movement. The attachment of the pneumatic buffer device A to a bracket on the chassis when the steel suspension is properly re-arranged enables a car or chassis to be sensitively sprung under a light as well as under a heavy axle load, and when attached it prevents many steel springs from being broken when subject to excessive road shocks and also tends to prevent the overturning of a car traveling at high speeds around a sharp corner, because the pneumatic buffer device A under such circumstances automatically strengthens the suspension and enables it to take the excessive shock.

The attachment beads $C^2$, $C^9$, or $CC^2$, $CC^9$ of the air retaining tube ring covers C or CC (see Figs. 1, 2 and 3) are preferably manufactured of rubber or rubber and fabric being molded or constructed fairly thick and formed on one side of the tube cover instead of on its inner circumference to enable the tube ring air covers to be greatly distorted horizontally without developing objectionable friction under severe work, or the tube ring may be manufactured homogeneous from rubber without using fabric or cord in its construction forming a tube ring air cover CC (see Figs. 1 and 3, Sheet 1).

My pneumatic buffer device A may be formed from one pneumatic cavity stud air cover $D^1$ having a rubber attachment base bead $D^2$ (see Fig. 15), or two cavity stud air covers $D^3$, $D^4$, (see Fig. 16) may be suitably placed or molded one on top of the other each pneumatic cavity stud air cover $D^3$, $D^4$, having inside it when in action a suitable air density which makes each cavity stud capable of supporting the varying loads put upon them under severe road work without becoming permanently distorted, the load carried automatically reducing the cubic air spaces B and BB within the pneumatic cavity studs $D^1$, $D^3$, $D^4$, (see Figs. 15 and 16). The pneumatic studs $D^1$ or $D^3$ may be attached to an air retaining plate which I call plunger M, by means of a metal ring device FF enabling the cavity stud air cover $D^1$ or $D^3$ to be formed into a pneumatic buffer device A and be attached to the end of a laminated spring of say a motor vehicle by means of a metal tube casing or frame K (see Figs 15, 16 and 17) which surrounds and protects the pneumatic buffer device or devices A, the metal tube casing K having a fixed but easily detachable top $K^1$ and bottom $K^2$ and of such dimensions, shape and construction that objectionable friction does not take place between the pneumatic buffer device or devices A and the inner circumference of the metal tube casing K when the pneumatic buffer device A is being greatly distorted or flattened by carrying a heavy load or by receiving a great shock and the pneumatic buffer device or devices A may pneumatically float the metal tube casing K allowing it to reciprocate quickly as and when required, under varying shocks. When the metal tube casing or frame K is used I may use a suitable say fixed spindle L and air retaining plate plunger M on which the said metal tube casing or frame K may reciprocate. The top end $L^1$ of the spindle L outside the metal tube casing or frame K may be attached to say a fixed chassis bracket or to an auxiliary chassis frame spring P (used instead of the fixed bracket) the spindle L passing through a suitable bearing R in the detachable top $K^1$ of the metal tube casing K and the bottom end $L^2$ of the spindle L which is inside the metal tube frame K may be suitably attached to the guiding plunger M and a second or double pneumatic cavity stud $D^4$ (see Fig. 16) may be easily attached by a metal ring device $FF^1$ to the inside of the detachable bottom $K^2$ of my reciprocating metal tube casing K which detachable bottom $K^2$ may form the air retaining plate of the second or double pneumatic cavity stud $D^4$. When attaching the reciprocating pneumatic casing K, I may use an attachment metal band or strap T having its two ends $T^1$, $T^2$ carried by the bolt $T^3$ which also carries the end of the laminated spring, the metal band or strap T being securely attached to the metal tube casing K, (see Figs. 15, 16 and 17.)

The pneumatic buffer device A may also be manufactured in the form of a cavity buffer air cover E or EE (see Figs. 7, 8, 18 and 19) having an open hole in both its top $E^5$ and bottom $E^6$ ends, and in constructing the cavity buffer EE, I may use fabric or cord and rubber, or rubber only. The air in the covers E and EE is densified as and when required with every increase of load by the cubic air space of the airtight chambers B and BB (see Figs. 7 and 8) being reduced. The cavity form of buffer air cover E or EE which is specially suitable for light cars is preferably manufactured interchangeable with the metal air retaining plates and attachment ring devices so that either form of air cover E or EE may be used. The top plate $G^1$ and bottom plate $G^2$ may be manufactured into what I call rocking plates $G^8$ and $G^9$ thereby enabling this pneumatic cavity buffer E or EE to be formed into a pneumatic shackle ES or EES, (see Figs. 7, 8, 18 and 19) which shackles are capable of being suitably attached to the end of a laminated spring by means of a bolt $EE^1$ which passes through the eye of the spring end or bracket frame and through corresponding lugs $EE^2$ and $EE^3$ formed on one of the rocking plates $G^8$ the other rocking plate $G^9$ being attached through lugs $EE^4$ and $EE^5$ to the laminated spring end by another bolt or pin $EE^6$ and on which bolts or pins $EE^1$ and $EE^6$ my pneumatic shackle ES or EES rocks, and when wanted the two rocking metal plates $G^8$ and $G^9$ may be mechanically attached by four metal hinged straps $G^{10}$, $G^{11}$, ($G^{12}$ not shown in drawings) and $G^{13}$, and by say six bolts or pins $G^{14}$, $G^{15}$, $G^{16}$, $G^{17}$, $G^{18}$, $G^{19}$, thereby giving lateral stability to my pneumatic shackle ES or EES without interfering with the vertical compression of the pneumatic cavity buffer. In my pneumatic buffer device A, I may, if required, use a suitable inner air tube V, (see Fig. 2) or bladder $V^1$, (see Figs. 6, 8 and 18).

It is to be specially noted that by means of this invention the existing suspension of a chassis or vehicle may be re-arranged and made sensitive under both light or heavy loads and be suitable for fast or slow speeds the suspension being never inoperative and always self-adjusting.

When attaching my pneumatic shock absorbing device A to a chassis, I preferably use a suitable bracket attachment which enables it to be attached to the chassis without making practically any alteration on the chassis frame so that a special bracket is not required for every make of chassis, and this bracket may be either part of or attached to the air retaining plate $G^1$ when the pneumatic shock absorber is attached direct to the chassis frame (see Figs. 11, 12, 13 and 14).

I may attach my pneumatic buffer device A to the frame of a car, vehicle, or to a chassis in any well-known manner and when necessary above the end of a cantaliver spring by means of attachment brackets, and at the same time reduce the stiffness of the cantaliver spring by taking away one or more of its leaves making the cantaliver spring sensitive to carry the minimum load, the pneumatic buffer device D or DD (see Figs. 5 and 6) coming into action and carrying the loads over the minimum and up to the maximum, thereby re-arranging a cantaliver spring so as to make it sensitive and efficient under both light and heavy loads.

By means of this invention, I am able to use a self-adjusting medium, namely, a very resilient pneumatic buffer device A which has a great speed of recovery to damp out or absorb the oscillations and vibrations which occur with all the existing laminated spring suspensions in a manner which no combination of spiral or laminated spring can possibly accomplish because of the slow speed of recovery or frequency of repose of any metal spring as compared with the quick speed of recovery of my pneumatic buffer device A. This pneumatic buffer device A and all its parts may be manufactured in all required shapes and dimensions and of suitable materials.

Claims:

1. A self-adjusting pneumatic buffer device comprising an air retaining cover having an attachment bead formed with a heel and a toe, an air retaining plate having a portion to receive said toe, an endless flanged attaching device engaging said heel, and fastening means for holding said bead under compression between said plate and attaching device.

2. A self-adjusting pneumatic buffer device comprising an air retaining cover having an attachment bead formed with a heel and a toe, an air retaining plate having a portion to receive said toe, an endless flanged attaching device engaging said heel, and bolts passing through said plate, heel, and attaching device for holding said bead under compression between said plate and attaching device.

In testimony whereof I affix my signature in presence of two witnesses.

EDWARD BRICE KILLEN.

Witnesses:
JOHN LIDDLE,
JOHN TRAIN LIDDLE.

Copies of this patent may be obtained for five cents each, by addressing the "Commissioner of Patents, Washington, D. C."